(12) United States Patent
Gallup et al.

(10) Patent No.: US 6,510,262 B2
(45) Date of Patent: Jan. 21, 2003

(54) OPTICAL SYSTEMS FOR Z-AXIS ALIGNMENT OF FIBER, LENS AND SOURCE ARRAYS

(75) Inventors: Kendra Gallup, Sunnyvale, CA (US); Brian Kim, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 55 days.

(21) Appl. No.: 09/738,919

(22) Filed: Dec. 15, 2000

(65) Prior Publication Data

US 2002/0191910 A1 Dec. 19, 2002

(51) Int. Cl.[7] .................................. G02B 6/32
(52) U.S. Cl. ............................ 385/33; 385/92; 385/93; 385/50; 385/56; 385/70
(58) Field of Search ............................ 385/92, 33, 50, 385/55, 56, 70, 76, 88

(56) References Cited

U.S. PATENT DOCUMENTS

| | | | |
|---|---|---|---|
| 5,737,463 A | 4/1998 | Weiss et al. ................... | 385/59 |
| 5,867,621 A | 2/1999 | Luther et al. .................. | 385/59 |
| 5,917,976 A | 6/1999 | Yamaguchi ................... | 385/88 |
| 6,130,977 A | 10/2000 | Rosson ......................... | 385/76 |
| 2002/0031313 A1 * | 3/2002 | Williams ...................... | 385/92 |

* cited by examiner

*Primary Examiner*—Robert H. Kim
*Assistant Examiner*—George Wang (57) ABSTRACT

An optical coupling system includes a unitary separation-setting member for establishing precise spatial relationships among a microlens array, an array of light sources, and an array of optical fibers. The separation-setting member includes an interior region with a shoulder against which the lens array is positioned. The shoulder is at a precisely controlled distance from a target plane along which the ends of the optical fibers are aligned. The target plane is defined by the front surface of the separation-setting member. Thus, the dimensions of the separation-setting member control the distance of the fiber ends from the microlenses. Moreover, a back surface of the separation-setting member is at a precisely controlled distance from the shoulder, so that when the back surface is rested against a substrate on which the light sources are mounted, the light sources are precisely positioned relative to the microlenses.

20 Claims, 8 Drawing Sheets

OPTICAL SYSTEMS FOR Z-AXIS ALIGNMENT OF FIBER, LENS AND SOURCE ARRAYS

TECHNICAL FIELD

The invention relates generally to optoelectronic devices and more particularly to maintaining source-to-lens alignment along three perpendicular axes.

BACKGROUND ART

Transmitting data using optical signals is increasingly taking the place of the traditional approach of exchanging data via electrical signals. An optoelectronic module provides the interface between an optical transfer medium and an electrical medium. For example, the optical transfer medium may be a fiber cable that terminates with a connector that exposes ends of an array of optical fibers. Laser diodes, such as Fabry-Perot lasers or Vertical Cavity Surface Emitting Lasers (VCSELs), are commonly used to generate optical signals in response to electrical excitation signals. Laser diodes are preferred in many applications, since they provide high performance signaling in a miniaturized environment.

Figure 1:
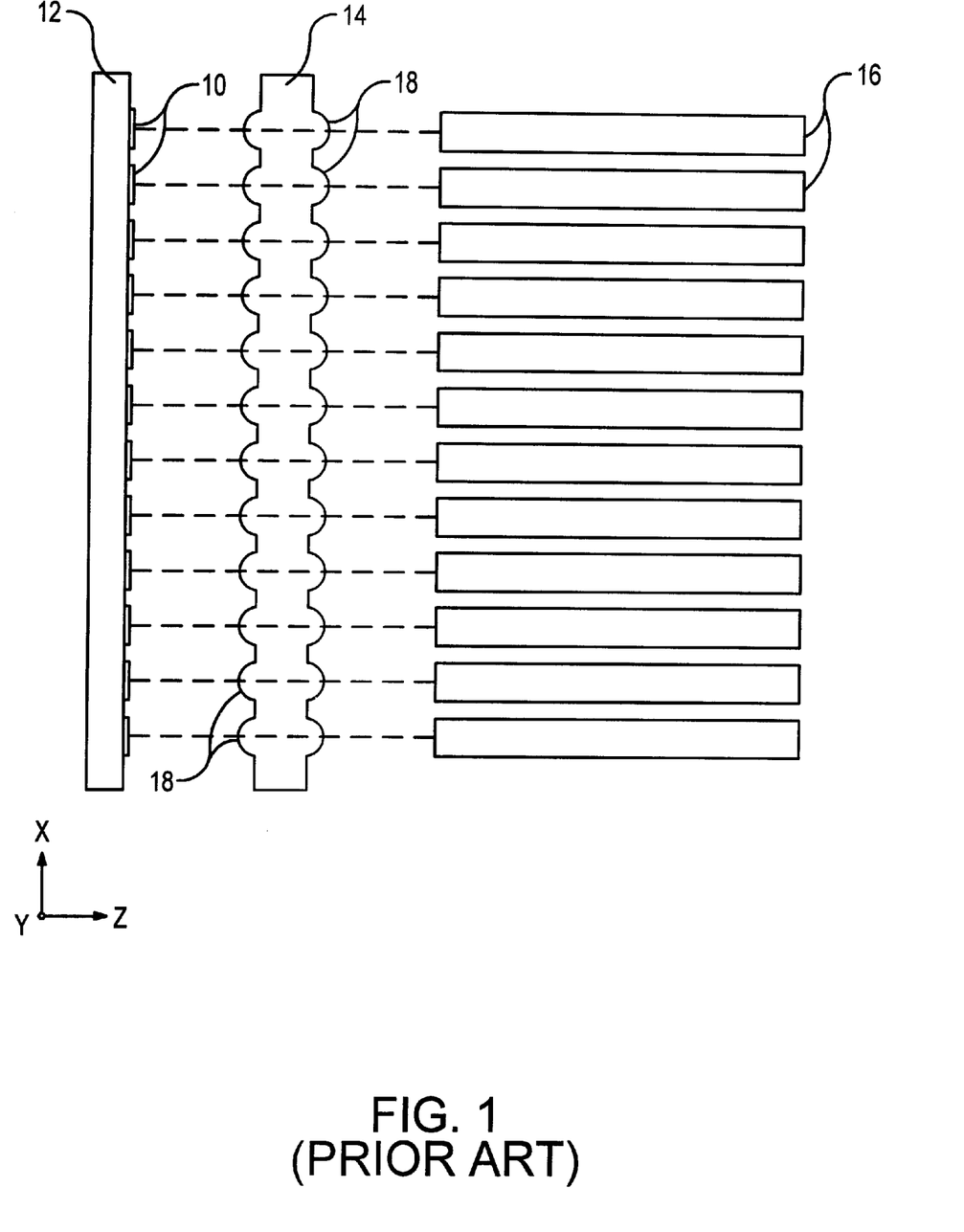
FIG. 1 is a schematic top view of a lens array between an array of light sources and an array of optical fibers.

FIG. 1 illustrates key components of an optoelectronic system. In the illustrated embodiment, the system is a twelve-channel parallel fiber arrangement. Light sources 10, such as VCSELs, are fabricated on a substrate 12. The substrate may be a semiconductor die, such as a gallium arsenide chip. A lens array 14 resides between the light sources and an array of parallel optical fibers 16. The lens array is shown as including a number of optical elements 18, which are used to manipulate light rays passing from the sources 10 to the fibers 16. For example, the optical elements may be diffractive elements.

While not shown in FIG. 1, an optoelectronic module includes hardware components that secure the light sources 10, the lens array 14, and the optical fibers 16. As is well known in the art, the optical components should be aligned along x and y axes to ensure integrity of signal exchanges. Often, guide pins are used to provide the alignment. For example, guide pins extending along the z axis may have central regions that pass through the lens array 14, so that end portions can extend into both the substrate 12 and the removable connector that supports the optical fibers 16. U.S. Pat. No. 5,917,976 to Yamaguchi describes an optical transmission path coupling apparatus that includes guide pins and guide pin holes to provide alignment of fibers to microlenses and light receivers/emitters, with the alignment being along the x and y axes. U.S. Pat. No. 5,867,621 to Luther et al. describes the use of guide pins to properly position two optical fiber connectors, so that the fibers of the connectors are aligned along the x and y axes.

Alignment along the z axis is also important to achieving desired performance in a high speed application. In one example, the desired distance between the light sources 10 and the optical elements 18 may be 2.0 millimeters, with a tolerance of ±35 microns in order to pass a sufficient percentage of emitted light to maintain performance. Z-axis alignment is set in some products by lowering the lens array 14 over the array of light sources 10 while sensing the light that is transmitted through the optical elements 18. The lens array is fixed in position relative to the light sources when maximum light is transmitted through the optical elements.

Another z-axis alignment that is critical to optimal performance is the alignment of the ends of the fibers 16 from the optical elements 18. As one example, the target distance may be 0.475 millimeters, with a tolerance of ±25 microns. This may be achieved by using an alignment tool to join a connector receptacle to another component of the optoelectronic module to which the lens array 14 is attached.

While the use of known alignment tools and procedures may provide the target results, the process is often time consuming, so that production throughput is lowered. What is needed is a system and method that provide repeatable precision alignments for an optoelectronic module, with alignments along three axes being achieved without the need of alignment fixtures.

SUMMARY OF THE INVENTION

An optical coupling system utilizes a one-piece, separation-setting member for defining precise spatial relationships from a lens array to both an array of light sources and an array of optical fibers. The optical fibers are arranged along an end face of a fiber connector that abuts an exterior connector-contacting surface of the separation-setting member. The connector-contacting surface is configured to locate and align the optical fibers along a "target" plane.

The separation-setting member includes an interior region in which the lens array resides. The lens array abuts a shoulder having a precisely controlled distance from the target plane having the ends of the optical fibers when the fiber connector is seated against the connector-contacting surface. This precisely controlled distance is based upon maximizing the light transfer through the optical lenses of the lens array to the fibers. The lens array is seated in a manner in which it is parallel to the target plane and is exposed to the target plane through an opening within the separation-setting member.

The separation-setting member also includes a back surface that has a precisely controlled distance from the shoulder against which the lens array is seated. During assembly, the back surface is positioned against a substrate that supports the array of light sources. For example, the substrate may be a flex circuit having conductive traces to a semiconductor chip on which light sources, such as VCSELs, are integrated. Because the back surface is at the precisely controlled distance from the shoulder and because the back surface is parallel to the shoulder and the target plane, the light sources will have a desired orientation and distance relative to the lens array. In the preferred embodiment, the portion of the back surface that abuts the light source-supporting substrate is comprised of a number of feet that are strategically positioned to ensure that the parallelism is maintained while providing some access to the interior for a bonding step.

An advantage of the invention is that fabricating the separation-setting member to tight tolerances enables the spatial relationships to be achieved without the use of special z-axis alignment steps or tools. Axial alignments along x and y axes are achieved using conventional techniques. For example, the lens array is precisely positioned along the shoulder using a visual alignment system prior to gluing the lens array to the shoulder. Subsequently, x-direction alignment and y-direction alignment between the lens array and the array of light sources may be achieved using active alignment in which power through the lenses from the light sources is monitored while the relative positioning of the two arrays is stepped in increments of one micron. The separation-setting member is fixed in the position at which power is at a maximum. Guide pins are used to provide x and y axes alignment of the connector. It should be noted that the use of guide pins requires exacting positional tolerances of the guide pin holes. The guide pins should extend through the separation-setting member into holes of both the fiber connector and the light source-supporting substrate.

The preferred embodiment of the optical coupling system includes a connector receptacle that releasably attaches the fiber connector such that the fiber ends are aligned along the target plane. That is, the receptacle should position the connector to abut the separation-setting member. In this preferred embodiment, the receptacle has both a locked position and a release position relative to the separation-setting member. In the locked position, the receptacle physically engages the separation-setting member, so that the one-piece components are in a desired orientation. However, by rotating the receptacle, the receptacle is moved to its release position in which it can be removed from the separation-setting member.

In accordance with the method, the lens array is seated within the interior region of the separation-setting member, so as to contact the shoulder. The back surface of the separation-setting member is then placed in contact with the substrate on which the light sources reside. In one example of the method, the lens array is 2.0 millimeters from VCSELs fixed to a flexible circuit. The distance from the VCSELs to the array is maintained within a tolerance of 35 microns by forming the separation-setting member with a shoulder-to-back surface tolerance of ±10 microns. Moreover, the parallelism of the shoulder and the rear surface is maintained by the fabrication processing during the formation of the separation-setting member.

The connector receptacle is rotated into its locking position onto the front surface of the separation-setting member. In this position, insertion of a fiber connector into the receptacle places the connector end in abutment with the connector-contacting surface of the separation-setting member. Thus, the fiber ends are aligned along the target plane that is at a controlled distance from the lens array. In one embodiment, the connector is a Mechanical Transfer Plug (MTP) connector that is spring biased into contact with the separation-setting member. The use of MTP connectors and other spring-biased connectors is well known in the art. The distance between the fiber ends and the lens array may be held to 0.475 millimeters, ±25 microns, using the invention.

In one embodiment, the optical coupling system also includes a housing having a first portion adapted to receive the substrate after it has been connected to a heatsink or other component. A second portion of the housing is adapted to securely hold the connector receptacle. For example, the connector receptacle may be simultaneously locked to the separation-setting member and the housing by rotating the receptacle from its release position to its locking position. In a final step, the assembled system is coated with an adhesive to provide extra strength. An advantage of the housing is that it eliminates the need for fixturing to hold the parts together while they are being glued and cured.

DETAILED DESCRIPTION

Figure 2:
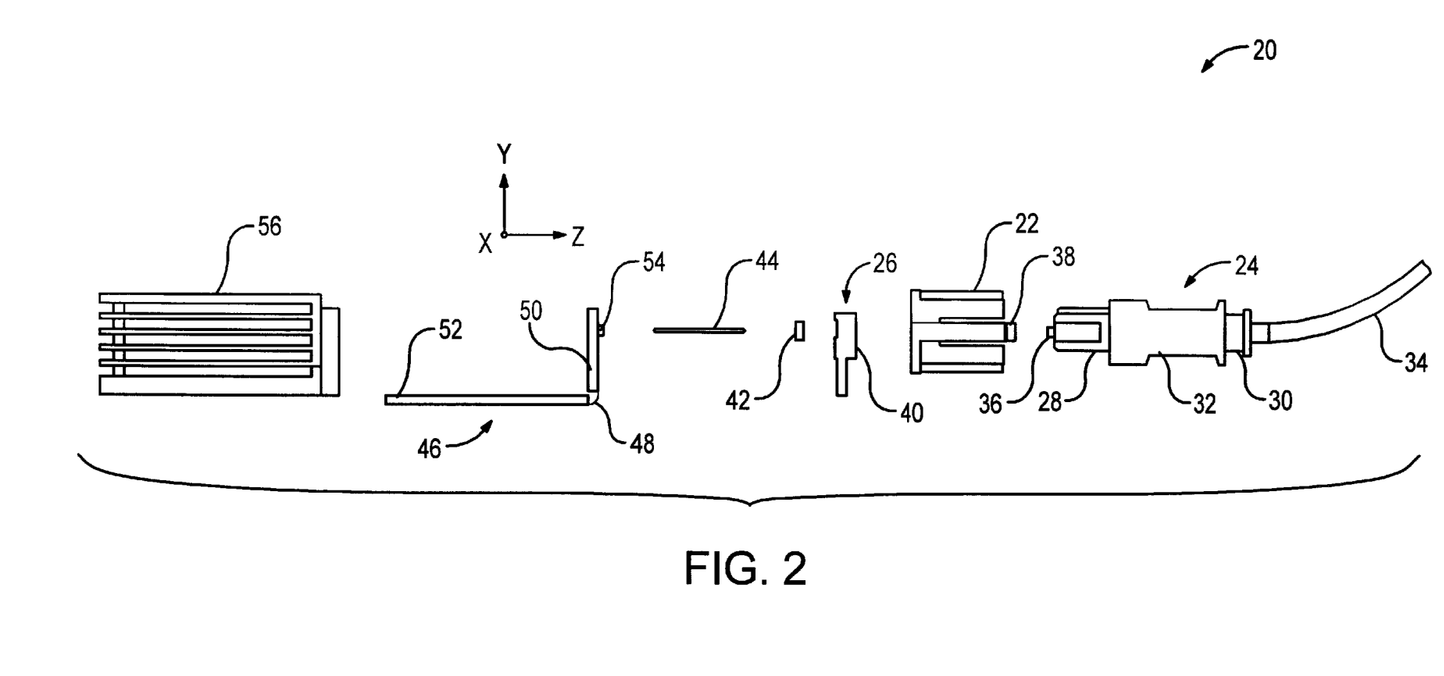
FIG. 2 is an exploded view of an optical coupling system in accordance with the invention.

With reference to FIG. 2, an optical coupling system 20 is shown in an exploded view. The system includes a receptacle 22 that releasably locks to both a connector 24 and a separation-setting member 26. The configuration of the receptacle 22 depends upon the type of connector. In one embodiment, the connector is a Mechanical Transfer Plug (MTP) connector, which is also known as a Mechanically Transferrable Plug. Such a connector includes a mating end 28, a cable entry end 30 and a spring-biased body 32. A fiber cable 34 enters the connector 24 and the ends of the individual fibers are exposed at a ferrule 36.

When the spring-biased body 32 of the connector 24 is moved rearwardly relative to the mating end 28, indentations are exposed which mate with latches 38 of the receptacle 22. Thus, the connector is locked in position within the receptacle by operation of the latches. As a result, the position of the ferrule 36 is such that there is contact with the front surface 40 of the separation-setting member 26.

As will be explained more fully below, a lens array 42 resides within the interior region of the separation-setting member 26. The lens array includes a number of optical elements that corresponds to the number of fibers exposed at the ferrule 36 of the connector 24. When the coupling system 20 is fully assembled, the fibers are optically aligned with the lenses of the lens array 42. By fabricating the separation-setting member 26 using exacting tolerances, the components are precisely aligned with regard to positioning along the z axis.

In a conventional manner, guide pins 44 pass through the separation-setting member 26 and into the mating end 28 of the connector 24 to ensure positioning of the connector along the x and y axes. While only one guide pin 44 is shown in FIG. 2, there are typically at least two such pins.

The guide pins 44 also extend at least partially into a substrate assembly 46 that includes a flex circuit 48 and a pair of metallic members 50 and 52. The flex circuit is formed of a flexible material, such as polyimide, having an array of bond pads on the portion of the flex circuit that is attached to the horizontal metallic member 52. Thus, the bond pads are used for connection to external circuitry which provides drive signals and power for operating light sources on a semiconductor chip 54 that is connected to the portion of the flex circuit on the vertical metallic member 50. Conductive traces from the bond pads to the semiconductor chip 54 are used to conduct the drive signals and to provide the necessary power to the light sources. Typically, the flex circuit 48 also includes processing circuitry, such as power amplifiers, but this is not critical.

A heatsink 56 is thermally coupled to the vertical and horizontal metallic members 50 and 52. The function of the heatsink is to maintain the circuitry along the flex circuit 48 at a desirable operating temperature. The use of the heatsink is not critical to the invention.

Figure 3:
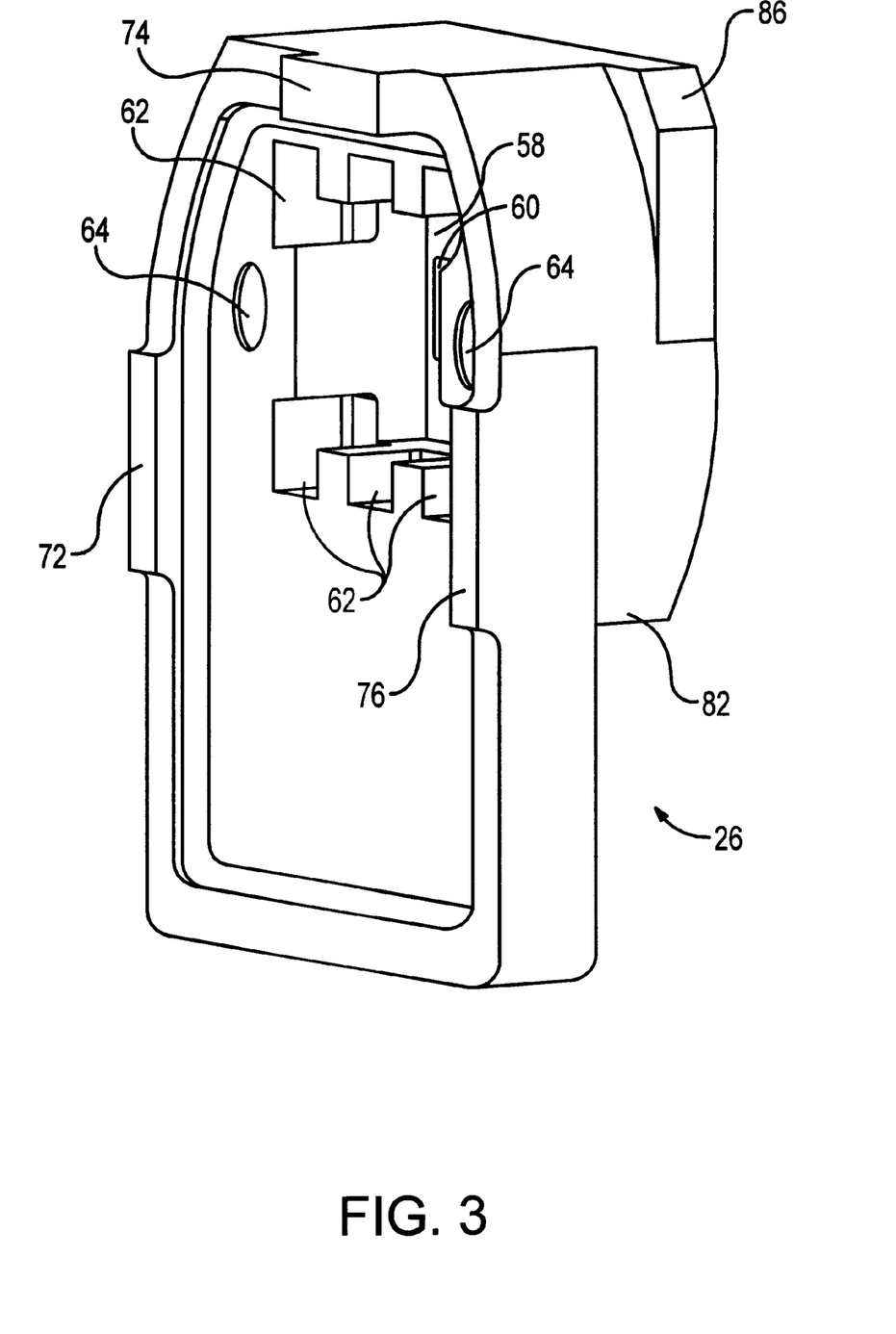
FIG. 3 is a perspective view of a one-piece, separation-setting member that is used in the system of FIG. 2.

A perspective view of the separation-setting member 26 is shown in FIG. 3. The dimensions of the member 26 are not critical. In one application, the vertical height, as viewed in FIG. 3, is 8.325 mm and the width is 7.3 mm. The member may be formed of a molded plastic material that may be shaped to provide features which satisfy exacting tolerances.

Figure 4:
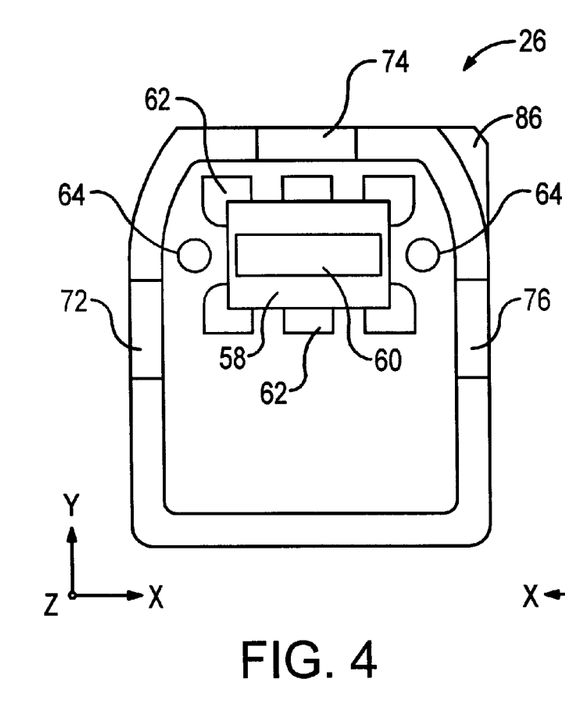
FIG. 4 is rear perspective view of the separation-setting member of FIG. 3.
Figure 5:
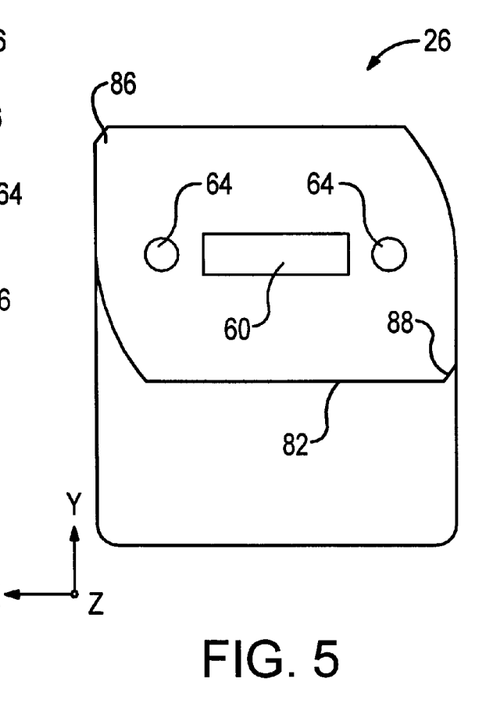
FIG. 5 is a front view of the separation-setting member of FIG. 4.
Figure 6:
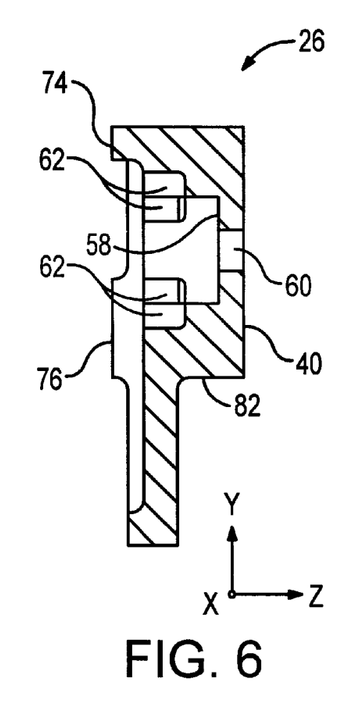
FIG. 6 is a side sectional view of the separation-setting member of FIG. 5.

The separation-setting member 26 is also shown in FIGS. 4–6, with FIG. 4 being a rear view, FIG. 5 being a front view, and FIG. 6 being a side sectional view. The main function of the member 26 is to secure the lens array 42 of FIG. 2 in a precise location. The location of the lens array is critical, since it must receive the light from the light sources on the semiconductor chip 54 and must focus the light on the fibers that are exposed at the end of the connector 24. In another embodiment, the fibers release light that is focused upon photodetectors on the semiconductor chip 54.

The member 26 includes an interior region that receives the lens array, so that the lens array is placed flat against a rectangular shoulder 58, as best seen in FIGS. 4 and 6. The rectangular shoulder includes a central opening 60 for the passage of light from the lens array to the optical fibers, or from the optical fibers to the lens array. Other features 62 within the interior region are provided to aid in applying epoxy to fix the lens array against the shoulder 58.

As noted with regard to FIG. 2, the ferrule 36 at the end of the fiber connector 24 is held against the front surface 40 of the separation-setting member 26. The distance between the front surface 40 and the shoulder 58 is precisely controlled to define the z-axis alignment of the lens array and fiber array. The distance between the two surfaces is controlled to ±20 microns. Moreover, the parallelism of the shoulder 58 to the front surface 40 is tightly controlled. Alignments in the x direction and the y direction are provided using conventional techniques, such as active alignment. A visual alignment system monitors power that passes through the lenses as the relative positioning of the lens array is moved incrementally. The lens array is glued to the shoulder 58 when the position of maximum power is detected. This procedure is also followed to achieve x axis alignment and y axis alignment of the separation-setting member to the array of light sources. The guide pins 44 of FIG. 2 are used to provide repeatable x axis and y axis alignment of the connector to the lens array and light array. The guide pins pass through cylindrical openings 64 that are only slightly larger in diameter than the guide pins. To ensure that the connector is firmly and repeatedly positioned such that the fiber ends are aligned with the lenses, the guide holes 64 must be precisely located and must be perpendicular to the shoulder 58 and the front surface 40.

As described with reference to FIG. 2, the light sources are integrated into a semiconductor chip 54 on a flex circuit 48. The flex circuit is joined to two metallic members 50 and 52. This assembly 46 is shown in greater detail in FIG. 7, with some features being deleted for the purpose of providing clarity. The flexible substrate 48 includes a number of bond pads 65. Drive circuitry may be formed on a separate circuit board or semiconductor chip that resides within a recess 68. By locating the circuitry substrate within the recess 68, the substrate is in better thermal engagement with the metallic member 50, as compared to mounting the circuitry substrate on the surface of the insulative flex circuit. The traces that extend from the bond pads 65 to the circuitry or the light sources are not shown.

Figure 7:
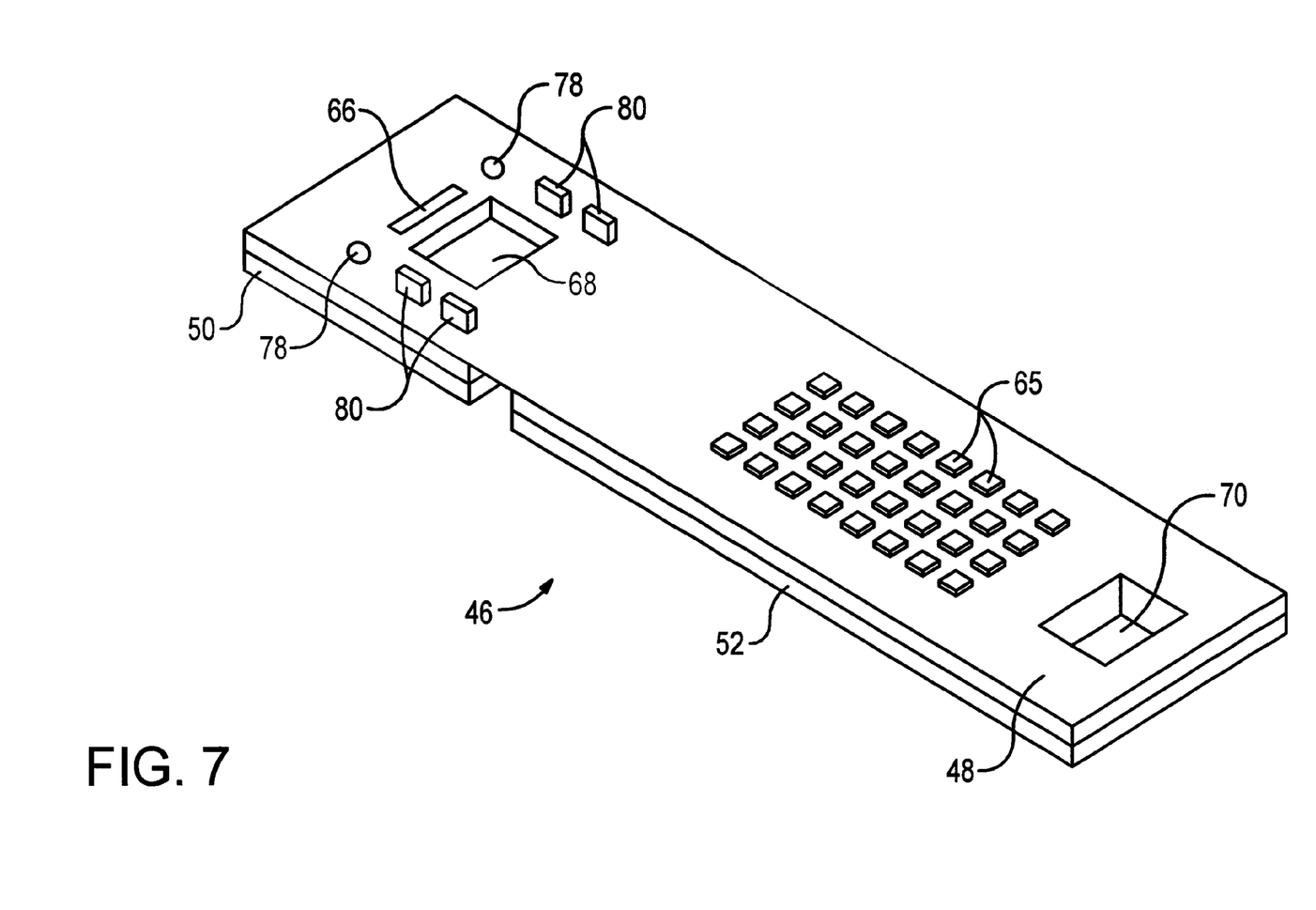
FIG. 7 is a perspective view of a flex circuit assembly of FIG. 2.

An opening 70 through the flex circuit 48 and the metallic member 52 is used to seat a memory chip to the flex circuit. Bonding material may be formed on the memory chip and the surface of the flex circuit 48 to securely hold the chip in position.

After the lens array 42 of FIG. 2 has been precisely located within the separation-setting member 26, the member 26 is placed into contact with the surface of the flex circuit 48. As best seen in FIG. 3, the rear surface of the separation-setting member 26 includes three feet 72, 74 and 76 that extend outwardly and that will contact the surface of the flex circuit 48. A fixturing tool is not necessary for z axis alignment. Rather, the member 26 may be turned upside down, so that the feet rest flat against the surface of the flex circuit 48. The feet provide a planar rear surface that is a precisely controlled distance from the shoulder 58 against which the lens array rests. As with the spatial and orientational relationship of the shoulder 58 to the front surface 40, the parallelism and distance between the lens array and the light sources are ensured by the precise fabrication of the separation-setting member 26. With regard to alignment along the x and y axes, the active alignment techniques are employed. Features 80 on the flex circuit 48 may be used for proper positioning and for fixing the flexible substrate to the separation-setting member. For example, an adhesive or other bonding material may be used.

Figure 8:
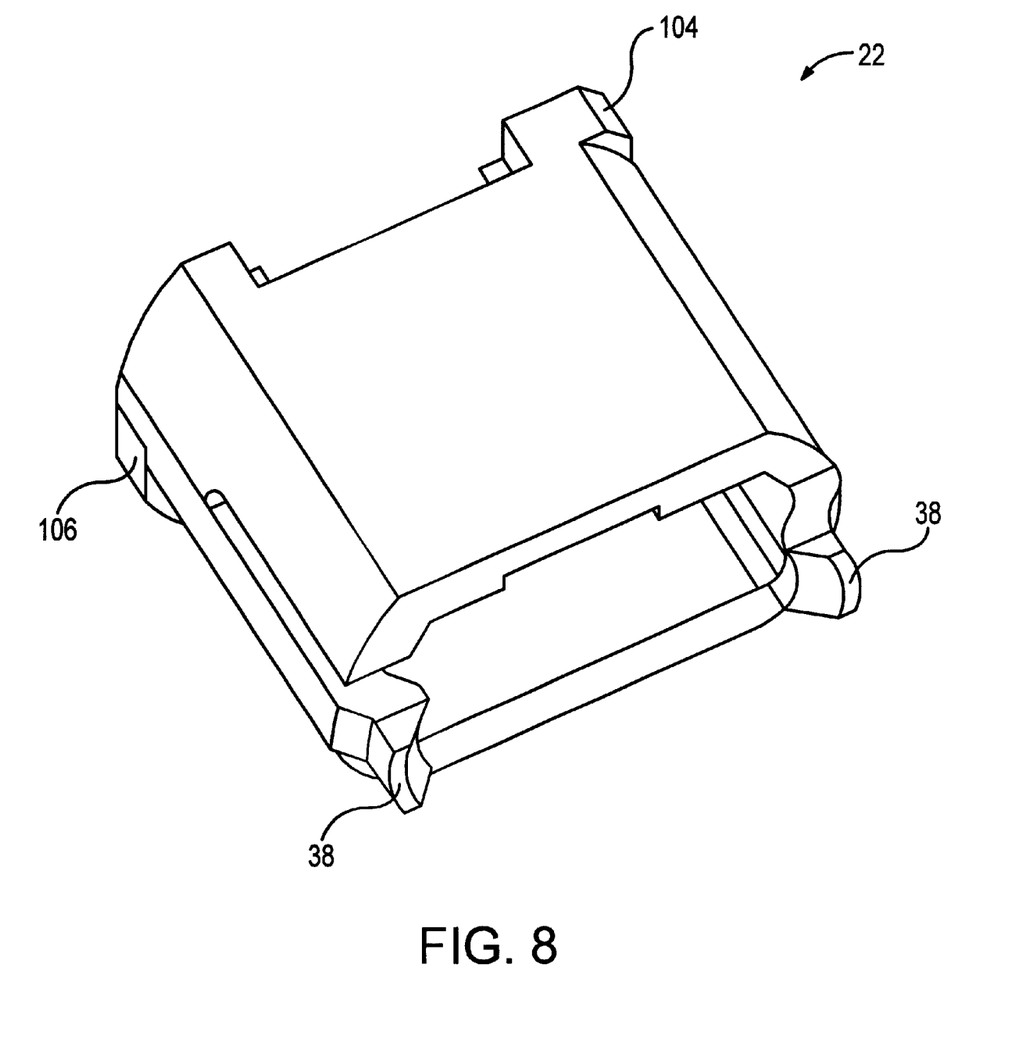
FIG. 8 is a perspective view of a connector receptacle of FIG. 2.
Figure 9:
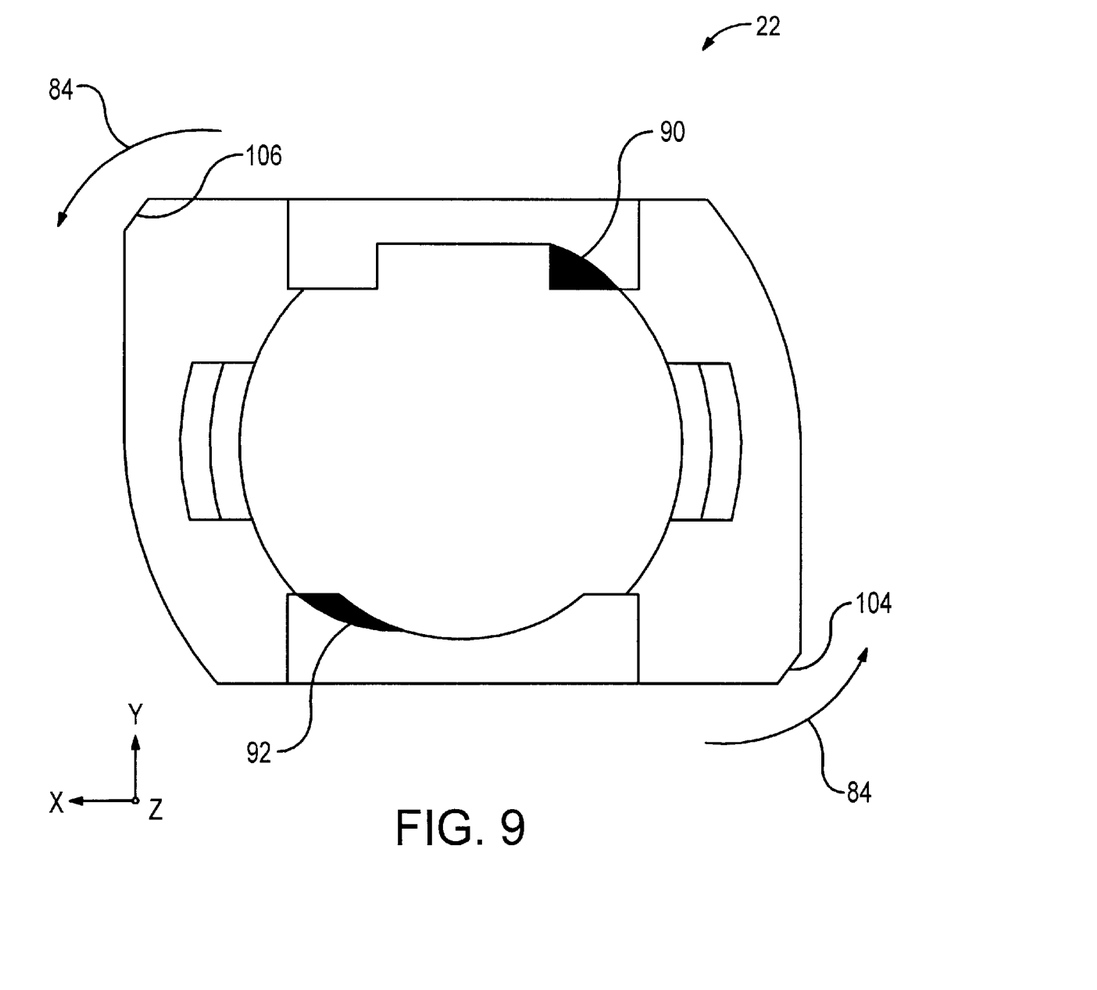
FIG. 9 is a rear view of the connector receptacle of FIG. 8.

Referring again to FIG. 2, the connector receptacle 22 must be properly fit to the separation-setting member 26 to ensure that the fibers in the connector 24 are aligned with the microlenses of the lens array 42. The main function of the receptacle 22 is to guide the connector 24 into the precise location necessary to ensure proper optical communication. Referring now to FIGS. 2, 8 and 9, the receptacle is dimensioned to receive the connector such that the guide pins 44 extend into guide pin holes within the connector. The spring-biased body 32 of the connector is pressed rearwardly to expose the indentations in which the latches 38 extend to lock the connector into contact with the receptacle and with the separation-setting member 26. The receptacle is formed of a material which allows the latches to move short distances toward and away from each other without undue material fatigue.

Referring now to FIGS. 3, 8 and 9, the end of the receptacle opposite to the latches 38 extends around the outwardly projecting front portion 82 of the separation-setting member 26. That is, the outwardly projecting portion 82 is dimensioned to enter the interior of the receptacle 22. As represented by the arrows 84 in FIG. 9, the receptacle rotates relative to the separation-setting member. The receptacle is shown in its locking position in FIG. 9. During assembly, the receptacle is rotated to a position in which an ear 86 on the separation-setting member (FIG. 3) is able to freely enter the receptacle. As can be seen in FIG. 5, there is an ear in the upper left hand corner of the outwardly projecting portion 82, but there is no similar ear in the upper right hand corner. A second ear 88 is located in the corner of the projecting portion 82 diagonal from the first ear 86. While not apparent in FIG. 5, the second ear 88 is slightly spaced away from the non-projecting lower portion of the member 26. In the rotated release position of the receptacle of FIG. 8, the ears 86 and 88 enter into the interior of the receptacle. However, when the receptacle is rotated to its locking position, the ears attach the member 26 to the receptacle 22 by rotating behind the regions 90 and 92 that have been blackened in FIG. 9 to more clearly identify the locking arrangement. With the ears 86 and 88 of FIG. 5 residing behind the locking areas 90 and 92 of the receptacle 22, the receptacle and separation-setting member are properly aligned. In this alignment, the top surface of the receptacle is parallel to the centerline that connects the two guide pins 44. Thus, the connector is precisely positioned when the connector is inserted into the receptacle.

Figure 10:
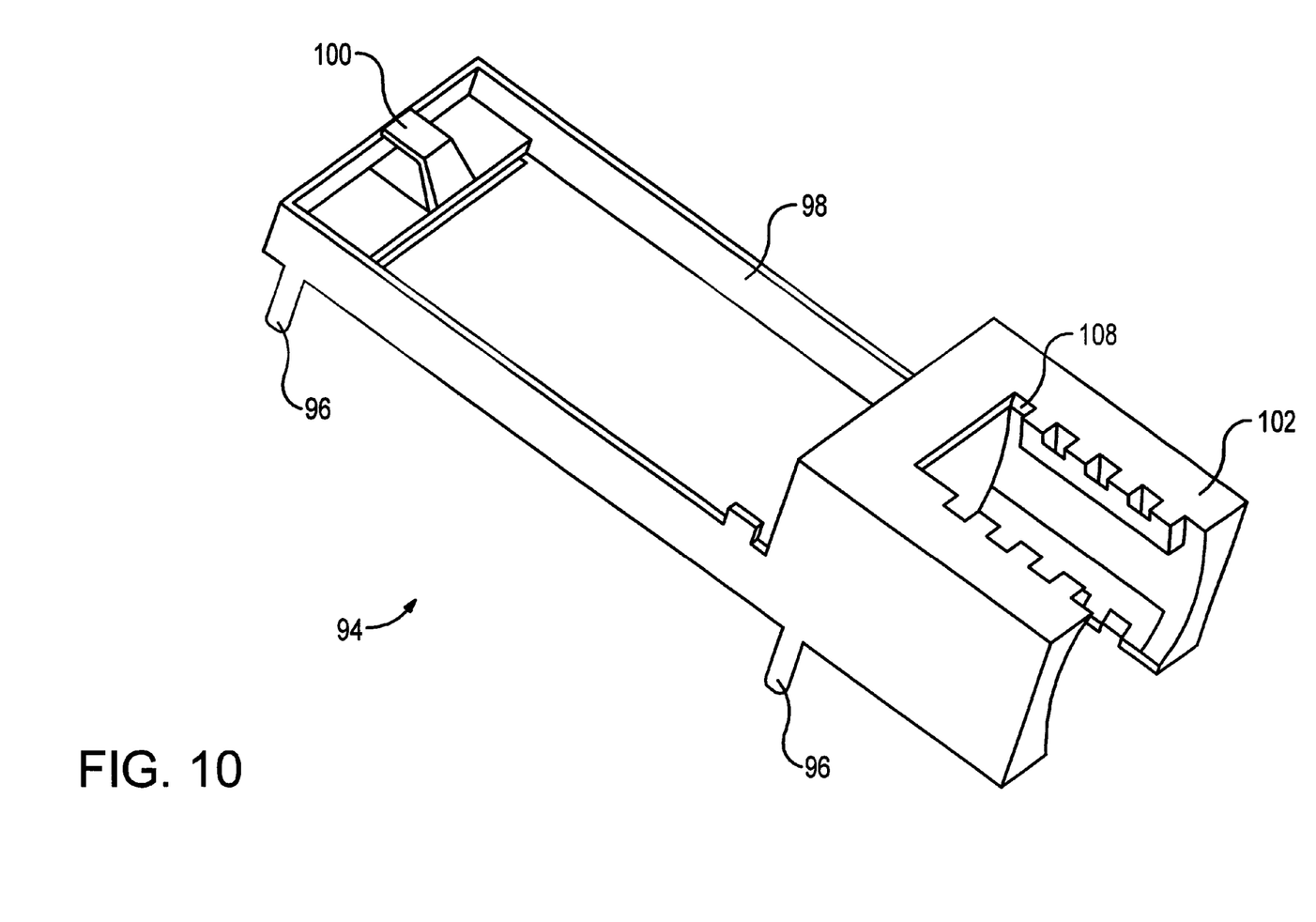
FIG. 10 is a perspective view of a housing for securing the optical coupling system of FIG. 2.

Referring now to FIGS. 2 and 10, the optical coupling system 20 is preferably maintained within a housing 94 having bottom projections 96 that can extend into a printed circuit board or the like to stabilize the system. A rearward portion 98 of the housing 94 is open and is dimensioned to receive the heatsink 56 after it has been adhered to the two metallic members 50 and 52 and after the separation-setting member 26 with the lens array 42 has been seated against the surface of the flex circuit 48. While not shown in FIG. 2, the heatsink 56 includes an open region that allows a rearward projection 100 of the housing 94 to enter the heatsink. Thus, the projection 100 prevents the heatsink from inadvertently being moved rearwardly.

With the heatsink 56, flex circuit 48, lens array 42 and separation-setting member 26 assembled onto the housing 94, the connector receptacle 22 is rotated and locked onto the separation-setting member 26. As previously noted, the rotation of the receptacle relative to the ears 86 and 88 of FIG. 5 causes the ears and the major portion of the member 26 to be on opposite sides of the locking areas 90 and 92 of FIG. 9, thereby locking the member 26 to the receptacle 22. Simultaneously, the rotation of the receptacle 22 locks the receptacle into a front portion 102 of the housing 94. Referring to FIGS. 8 and 10, diagonally opposite ears 104 and 106 on the receptacle 22 are used to lock the receptacle to the front portion 102 of the housing. The front portion 102 has a key 108 on only one side of the top surface. The ear 106 of the receptacle (FIG. 8) is able to rotate into the key 108 of the housing. A similar key (not shown) resides on the lower surface of the front portion 102 of the housing 94. This second key is positioned to receive the ear 104 (FIG. 8) that is diagonally opposite to the ear 106. Therefore, the receptacle 22 brings all of the parts together and holds them in place while a gluing step is practiced to provide extra strength. Thus, the use of the receptacle 22 eliminates the need of fixturing to hold the parts together while they are being glued and cured.

What is claimed is:

1. An optical coupling system comprising:
   a lens array of optical lenses;
   a one-piece, separation-setting member for defining precise spatial relationships from said lens array to both an array of light sources and a fiber connector having an array of optical fibers, said separation-setting member having an exterior connector-contacting surface configured to locate and align said optical fibers along a target plane when said fiber connector is seated against said separation-setting member, said separation-setting member further having an interior region with a shoulder against which said lens array is seated, said lens array being parallel to said target plane and being exposed to said target plane through an opening, said separation-setting member having a back surface on a side opposite to said connector-contacting surface, said back surface being a precisely controlled distance from said shoulder; and
   a substrate supporting said array of light sources, said back surface of said separation-setting member abutting said substrate such that said array of light sources is a controlled distance from said lens array.

2. The optical coupling system of claim 1 further comprising alignment members which contact each of said substrate and said separation-setting member and said fiber connector to provide precise alignment in directions parallel to said target plane, said shoulder against which said lens array is seated being along a plane between said back surface and said connector-contacting surface.

3. The optical coupling system of claim 2 wherein said alignment members are a plurality of guide pins that extend through said separation-setting member and into both said substrate and said connector.

4. The optical coupling system of claim 1 further comprising a one-piece connector receptacle having a locked position in which said connector receptacle physically engages said separation-setting member to secure said connector receptacle to said separation-setting member with respect to movement perpendicular to said target plane, said connector receptacle having a release position that is rotated relative to said locked position to enable said movement perpendicular to said target plane, said connector receptacle being configured to receive and secure said fiber connector in contact with said connector-contacting surface of said separation-setting member.

5. The optical coupling system of claim 4 wherein said connector receptacle includes latches to secure said connector receptacle to said fiber connector.

6. The optical coupling system of claim 5 wherein said connector receptacle is configured to receive a mechanical transfer plug (MTP) connector of a multi-channel parallel fiber array.

7. The optical coupling system of claim 4 further comprising a housing having a first portion configured to securely position said separation-setting member and said substrate, said housing having a second portion configured to securely position said connector receptacle relative to said housing and said separation-setting member.

8. The optical coupling system of claim 7 wherein said connector receptacle has projecting ears that engage said housing when said connector receptacle is rotated from said release position to said locked position relative to said separation-setting member.

9. The optical coupling system of claim 1 wherein said substrate includes a flexible circuit having conductive traces and wherein said array of light sources is a die having an array of vertical cavity surface emitting lasers (VCSELs), said die being mounted on said flexible circuit.

10. An optical coupling system comprising:
    a connector having a face and having a plurality of optical fibers exposed at said face;
    a receptacle releasably attached to said connector;
    a unitary separation-setting member having a front wall with an opening, said face of said connector abutting a front surface of said front wall, said separation-setting member having a rear surface that is along a plane at a precisely controlled distance from a plane of said front surface, said separation-setting member further having a lens-positioning surface along a plane that is at precisely controlled distances from said planes of said front surface and said rear surface;
    a lens array abutting said lens-positioning surface, said lens array having a plurality of lenses with optical axes aligned with said optical fibers through said opening of said front wall;
    a substrate having an array of VCSELs, said substrate abutting said rear surface of said separation-setting member; and
    alignment pins extending from said substrate to said connector to maintain alignments with regard to x and y axes, wherein alignments with regard to a z axis are maintained by contact of said front, rear and lens-positioning surfaces with said face and said substrate and said lens array, respectively.

11. The optical coupling system of claim 10 further comprising a housing connected to each of said substrate, said separation-setting member and said receptacle.

12. The optical coupling system of claim 10 wherein said receptacle is rotatable relative to said separation-setting member, said receptacle being configured to switch from a locking condition to a release condition with respect to said separation-setting member by rotation of said receptacle.

13. The optical coupling system of claim 10 wherein said connector is snap fit to said receptacle and said face is spring biased against said front surface of said separation-setting member.

14. A method of aligning a lens array to an array of light sources and an array of optical fibers comprising the steps of:
   forming a one-piece separation-setting member to include a shoulder in an interior region and to include a front connector-contacting surface and a rear substrate-abutting surface that are at precisely controlled distances from said shoulder, including providing an opening from said interior region and through said front connector-contacting surface;
   seating said lens array in said interior region and in contact with said shoulder;
   positioning said rear substrate-abutting surface of said separation-setting member in contact with a substrate having said array of light sources, said array of light sources being precisely positioned relative to said substrate;
   fixing said substrate to said separation-setting member, thereby securing said lens array relative to said array of light sources; and
   locking a connector receptacle to said separation-setting member in alignment with said front connector-contacting surface such that a connector which exposes said array of optical fibers is optically aligned with said lens array when said connector abuts said connector-contacting surface.

15. The method of claim 14 Wherein said step of locking said connector receptacle to said separation-setting member includes rotating said connector receptacle to a locking engagement with said separation-setting member.

16. The method of claim 15 wherein said step of locking said connector receptacle further includes forming said connector receptacle to maintain said connector in abutment with said connector-contacting surface of said separation-setting member.

17. The method of claim 14 further comprising using alignment pins to maintain target axial alignments of said lens array, said array of optical fibers and said array of light sources.

18. The method of claim 14 wherein said step of forming said separation-setting member includes providing parallel relationships between said connector-contacting surface, said substrate-abutting surface and said shoulder.

19. The method of claim 14 further comprising a step of seating said separation-setting member and said substrate and said connector receptacle in a housing.

20. The method of claim 19 further comprising a step of applying glue to said housing following said seating step.

* * * * *